United States Patent Office 3,477,443
Patented Nov. 11, 1969

3,477,443
METHOD OF IMPARTING FLAVOR TO SMOKING TOBACCOS
Masakazu Yamada and Hayashi Komoda, Tokyo-to, Japan, assignors to Nisshin Sangyo Kabushiki Kaisha, Tokyo-to, Japan, and Masakazu Yamada & Hayashi Komoda, a joint-stock company of Japan
No Drawing. Filed Apr. 27, 1967, Ser. No. 634,088
Claims priority, application Japan, Apr. 28, 1966, 41/26,923
Int. Cl. A24b 3/12, 15/00
U.S. Cl. 131—144
6 Claims

ABSTRACT OF THE DISCLOSURE

Tobacco products, such as cigars and the like, are flavored by spraying the tobacco products with liquid flavor components obtained by separation from the fermentation gas evolved during manufacture of alcoholic beverages, this fermentation gas comprising a large amount of carbon dioxide plus the flavor components. Separation of the flavor components is effected by bubbling the fermentation gas through a solvent for the flavor components, maintained at a temperature below the temperature of the fermentation gas, or by condensing the fermentation gas at a temperature below the liquefying temperature of the flavor components but above the liquefying temperature of the carbon dioxide.

BACKGROUND OF THE INVENTION

It is known to add flavor to tobacco products, such as smoking tobacco, cigars and the like, by spraying the same with alcoholic beverages such as rum, wine, etc., just before the tobaccos are packed and sealed in tins, packets, or the like. However, the various alcoholic beverages used for the spraying have lost a great deal of their original flavor during the course of their manufacture, such as brewing or distillation. Consequently, when flavoring of tobacco products is effected using alcoholic beverages in which the flavor content has been lost to a large extent, there is a definite limitation to the degree of flavor that can be imparted to the tobacco products since there is a limit to the quantity of the flavoring liquid which can be effectively utilized on the tobacco products without unduly increasing the moisture content of these products.

SUMMARY OF THE INVENTION

This invention relates to the flavoring of tobacco products by spraying with flavoring substances and, more particularly, to an improved method of effecting such flavoring by increasing the flavor applied to the products without increasing the moisture content of the products beyond an acceptable limit.

In accordance with the invention, the flavor imparted to the tobacco products is increased substantially, without any corresponding increase in the moisture content of the products, and by comparison with spraying with alcoholic beverages, by spraying the tobacco products with flavoring components of alcoholic beverages, which flavoring components have been separated from fermentation gas generated during manufacture of the alcoholic beverages. In particular, carbon dioxide gas, which is generated during fermentation of alcoholic beverages, is bubbled into a solvent such as, for example, liquid alcohols, liquid fats, liquid oils and the like, or mixtures thereof. Thereby, the flavor components which form, with carbon dioxide gas, the fermentation gas, are dissolved in the solvents with the carbon dioxide gas being bubbled off. Alternatively, the flavor components are extracted by cooling and condensing the fermantation gas to separate the flavor components from the carbon dioxide. The flavor components thus obtained are used independently as a spraying liquid or are mixed with other alcoholic beverages from which such flavors are derived. Then this flavoring liquid is sprayed onto the tobaccos, etc. in an appropriate quantity and at the most opportune time just before packaging, thereby enabling the flavor of the smoking articles to be increased a substantial degree, as compared to the conventional method, without any undue or corresponding increase in the moisture content of the spray articles.

At the time of production of alcoholic beverages which undergo fermentation, it is usual that carbon dioxide gas, which is almost equal in weight to alcohol to be produced at the time of alcoholic fermentation, is generated, the quantity of this fermentation gas being enormous and various kinds of flavors being contained therein as impurities. It has been discovered by the inventors, as a result of detailed studies on the process of producing such fermentative beverages, that almost all of the flavors are discharged in the air along with carbon dioxide gas generated in great quantity at the time of fermentation of mashes of wines, beer, whisky, rum, sake, synthetic sake, flavor liquids etc. It has also been found particularly and unexpectedly that flavors of distilled liquors such as whisky, rum, etc. which, have been considered only to enhance their flavors gradually during their being stored in a warehouse for a long period of time, are very close to the flavor components which are dispersed and lost together with carbon dioxide gas produced during fermentation of mashes of the alcoholic beverages.

From the above-stated facts, the present inventors conceived the present invention wherein the flavor components, dispersed and scattered together with carbon dioxide gas generated at the time of fermentation of mashes of various kind of alcoholic beverages, are captured and used as the spraying liquid at an appropriate time in the course of production of the smoking articles without a corresponding increase in quantity of the flavorous liquid or in the moisture content of the tobacco material, thereby obtaining effective flavoring.

The capturing of the flavor components from the fermentation products, according to the present invention, is carried out either by way of dissolving the fermentation gas generated at the time of production of an alcoholic beverage, or by condensing it by cooling in a gas cooling device. First of all, when the flavor component is dissolved out into a liquid solvent, the most suitable solvent can be water, ethyl alcohol, glycerine, propylene glycol per se, or a mixture of two or more of these substances. For example, it may be most suitable to use a solution consisting of 20% water and 80% alcohol with a small quantity of glycerine and propylene glycol mixed therewith. It is also possible, in this case, that the flavor components can be dissolved out and captured, rather than in the solvent as above mentioned, in ordinary alcoholic liquors such as beer, synthetic beer, soft beer, whisky, sake, synthetic sake, liqueur, brandy, wine, etc.

When it is desired to capture the flavor components without any kind of solvent whatsoever, the fermentation gas generated at the time of making alcoholic liquors is led into a gas cooling apparatus, as will be described hereinafter, where the fermentation gas is cooled and condensed to be liquefied. This liquid containing flavor components is used as the liquid for capturing the flavor component, whereupon the desired object can be attained. Capturing of the flavoring component by use of a liquid can be accomplished by introducing the fermentation gas, generated during production of the alcoholic liquors, into the liquid so as to disperse the flavor component thereinto together with carbon dioxide gas, whereupon $CO_2$ gas scatters and disperses and the flavors components remain in the liquid. However, it should be noted that rate of yield of the flavor component is greatly affected by the composition and temperature of this liquid, as well as by the manner of dispersion into this liquid, of the fermentation gas. Particularly, the temperature affects the vapor pressure of the flavor compenent, so that the temperature of the liquid should be lower than that of the fermentation gas. For instance, it is desirable that the temperature of the liquid be in the range of from 5 degrees C. to −25 degrees C. in the case of using 80% alcohol. In other cases, when an aqueous solution of 5% glycerine or alcoholic beverages itself is used, the temperature should at least be held from 5 degrees C. to 0 degrees C., which is most effective. In order to obtain an high rate of recovery of the flavor components, it is recommended that a flavor sustaining agent such as, for example, ethyl palmitate, ethyl stearate, phenyl ethyl alcohol, etc. be added beforehand in the liquid. The flavor component can be well sustained in the liquid and yet it does not easily scatter and disperse, even when the liquid returns to the normal temperature.

Next, direct condensation of the fermentation gas by introducing it into a gas cooling apparatus is involved in the concept of capturing the flavor component in the fermentation gas. The flavor component thus obtained is excellent in its capability of increasing the flavor of smoking articles, since the natural flavor is captured together with water and alcohol, etc. in the fermentation gas without use of a solvent, alcoholic liquor, and other solutions. There is no room for other components to be mixed therein. That is, the fermentation gas generated in the fermentation tank (or vessel) is introduced into a gas cooling apparatus, in which it is cooled strongly at a temperature lower than the temperature at which ethyl alcohol, fusel oil, esters and aldehydes, which are all flavor components, are condensed and liquefied, but higher than the liquefying temperature of carbon dioxide gas, thereby capturing the flavorous components as the condensed liquid. This method may be carried out at a temperature ranging from 30 degrees C. to −60 degrees C. In general, cooling at a temperature of about −20 degrees C. is required.

When this flavor liquid is used instead of rum, wine, or other alcoholic liquors which have heretofore been used for flavoring smoking tobaccos, etc., or when it is made a spraying liquid by being mixed with those conventionally used alcoholic beverages, it is possible to obtain smoking tobaccos, etc., in which the flavor is remarkably strengthened with the same quantity of the spraying liquid as used in the conventional flavoring with liquors.

The present invention, as above noted, contemplates the use of the flavoring liquid by itself, as a fluid spray or alternatively, it may be added to the conventional alcoholic beverages used as a tobacco flavoring spray. In the latter case, the intensity of the flavor of the alcoholic beverage may be increased without a significant increase in the quantity of spraying liquid or of the moisture content thereof. Particularly, since the flavor liquid is obtained from the carbon dioxide gas generated at the time of fermentation, which has heretofore been discharged into the air, the cost for obtaining the same is cheaper than that of alcoholic beverages or flavors to be obtained by any other method, which contributes to lower the production cost of the tobaccos, etc.

Flavor of rum is extracted from mash of molasses under fermentation, that of sake from the sake mash, that of beer from the brewing liquid of beer, that of whisky from whisky mash, and those of brandy and fruit wines, from the mashes of fruit wines such as grape wine etc.

As mentioned in the foregoing, the present invention is capable of increasing the natural flavor of alcoholic beverages used in spraying tobacco products without increase in the quantity of spraying liquid whereby flavoring smoking articles can be effected in a non-toxic and remarkably economical manner.

With a view to leading persons skilled in the art to possible reduction into practice of the present invention, the following actual examples are presented, but the invention is apparently not limited to these examples only.

Example 1

A tank accommodating 100 kilo litres of mash of molasses under fermentation is closely sealed, and carbon dioxide gas generated therefrom is led out by a conduit pipe to be bubbled into a mixture solution of 80% alcohol of 18 litres and glycerine of 2 litres. For 72 hours, the flavors components generated together with carbon dioxide gas are collected by dissolving these components into the solution, whereby 20 litres of flavor liquid having a high aroma of rum could be obtained. This flavor liquid is preserved in a sealed vessel. Pipe tobacco, cigars, cigarettes, etc. having a high flavor can be obtained by spraying this flavor liquid onto these smoking materials in the usual manner before they are processed into the finished products.

Example 2

5 kilo litres of whisky mash is accommodated in a closely sealed tank of 10 kilo-litre capacity. Just before fermentation reaches its maximum, fermentation gas is bubbled out from the bottom of the tank with the help of the pressure of carbon dioxide gas and dispersed into 2 litres of a solution composed of 20% of water, 79% of alcohol, and 1% of glycerine. The solution is kept cooled at 3 degrees C. and the natural flavor of the alcoholic beverage is captured in a three-day period. The flavor liquid thus obtained is closely sealed and stored in a cold, dark place. Flavoring the smoking articles is carried out by spraying this flavor liquid in an appropriate quantity onto the smoking material in a conventional manner.

Example 3

5 kilo litres of rum mash is accommodated in a closely sealed tank of 10 kilo-litre capacity. When the fermentation activity becomes enhanced, fermentation gas generated from the mash is led into a gas cooling apparatus, having the capability of cooling the fermentation gas, flowing thereinto at 15 degrees C. flowing therein at the rate of 18 litres per minute, to −20 degrees C. After a lapse of two days, 1.4 litres of condensed liquid, having the flavor of rum wine is obtained. Then, fermentation gas generated in a separate fermentation tank, in which fermentation of rum mash becomes enhanced, is further bubbled out into this condensed liquid by way of conduit pipes in three stages for two days to finally obtain a liquid of increased flavor. The flavor liquid is then closely sealed and stored in a cold, dark place, and is used for flavoring the smoking tobaccos, etc., by spraying it on the material in a conventional manner.

What we claim is:

1. In the method of treating tobacco products by spraying the products with liquids having flavors of alcoholic beverages, while limiting the moisture content of the products to a preselected value, the improvement comprising the steps of subjecting fermentation gas, containing a flavor component and a large amount of carbon dioxide gas and generated at the time of manufacturing an alcoholic beverage, to a temperature above the liquefying temperture of carbon dioxide gas but sufficiently below the generated temperature of the fermentation gas to separate the flavor component, in a liquid state, from the carbon dioxide gas; and spraying the tobacco products with the separated flavor component to impart flavor to the tobacco products while limiting the moisture content of the products to such preselected value, whereby there is no increase in moisture content of the tobacco products corresponding to the increase in the flavor imparted thereto.

2. In the method of treating tobacco products by spraying, the improvement claimed in claim 1, in which the fermentation gas is subjected to a temperature ranging from 30° C. to −60° C.

3. In the method of treating tobacco products by spraying, the improvement claimed in claim 1, including the steps of introducing and dispersing the fermentation gas into a non-toxic liquid solvents suitable for dissolving flavor component; and discharging the carbon dioxide gas from said liquid solvent during dispersing of the fermentation gas in said liquid solvent.

4. In the method of treating tobacco products by spraying, the improvement claimed in claim 3, in which said liquid solvent is selected from the group consisting of liquid alcohols, liquid fats, liquid oils, water, and mixtures thereof.

5. In the method of treating tobacco products by spraying, the improvement claimed in claim 3, in which said liquid solvent is the alcoholic beverage during whose manufacture said fermentation gas is generated.

6. In the method fo treating tobacco products by spraying, the improvement claimed in claim 3, in which the temperature of said liquid solvent is in the range from 5° C. to −25° C.

References Cited

UNITED STATES PATENTS 937,801  10/1909  Heddles _____ 131—144 X

OTHER REFERENCES

Ross-Mackenzie "A Standard Manual of Brewing and Malting and Laboratory Companion" (text), published by The Technical Press Ltd., London, 1927, 412 pages, pp. 351 and 352 cited.

MELVIN D. REIN, Primary Examiner

U.S. Cl. X.R.

131—17